United States Patent [19]
Robertson et al.

[11] Patent Number: 5,954,302
[45] Date of Patent: *Sep. 21, 1999

[54] MULTI-POSITIONABLE CABLE SPACER

[76] Inventors: George B. Robertson, 1918 Danville, Memphis, Tenn. 38115; Peter M. Wells, 1805 River Park Dr., Germantown, Tenn. 38139

[ * ] Notice: This patent is subject to a terminal disclaimer.

[21] Appl. No.: 08/428,459

[22] Filed: Apr. 25, 1995

[51] Int. Cl.⁶ .................................................... F16L 3/08
[52] U.S. Cl. .......................... 248/74.3; 248/74.4; 248/73
[58] Field of Search ............................ 248/74.3, 73, 74.4, 248/72, 65, 916; 24/115 H, 115 M, 136 N

[56] References Cited

U.S. PATENT DOCUMENTS

| | | | |
|---|---|---|---|
| 4,397,435 | 8/1983 | Fisher et al. | 248/61 |
| 4,562,982 | 1/1986 | McSherry et al. | 248/61 |
| 4,772,519 | 9/1988 | Irvine | 428/542.8 |
| 4,892,275 | 1/1990 | Szegda | 248/61 |
| 4,905,954 | 3/1990 | Taylor | 248/475.1 |
| 4,993,669 | 2/1991 | Dyer | 248/61 |
| 5,083,334 | 1/1992 | Orton | 24/16 |
| 5,279,485 | 1/1994 | Georges | 248/68.001 |
| 5,332,179 | 7/1994 | Kuffel et al. | 248/743 |

Primary Examiner—Ramon O. Ramirez
Assistant Examiner—Gwendolyn W. Baxter
Attorney, Agent, or Firm—Hoffman & Baron, LLP

[57] ABSTRACT

A cable spacer provides for the spacing of an article such as a cable, wire or conduit from a mounting panel such as a wall or ceiling. The mounting panel accommodates a cable tie for securing the spacer thereto. The spacer includes a spacer body having an article support surface for securely supporting the article thereagainst. The spacer body further includes plural non-coplanar mounting surfaces where each of the mounting surfaces is capable of being supported against the mounting panel. Tie spacer body further includes a cable tie attachment element which permits the accommodation of a cable tie where the spacer element is supported against the mounting panel with any of the non-coplanar mounting surfaces being positioned thereagainst. The spacer also provides for stackability of two or more similar spacers.

19 Claims, 3 Drawing Sheets

MULTI-POSITIONABLE CABLE SPACER

FIELD OF THE INVENTION

The present invention relates generally to a device used to support an article such as a cable, wire or bundle of cables or wires against a mounting panel such as a wall, ceiling or the like. More particularly, the present invention relates to a spacer used to space the article away from the mounting panel where the spacer may be employed in plural different positions.

BACKGROUND OF THE INVENTION

It has been long known to use cable ties to support electrical cables, wires, conduits or other elongate articles running along a panel, wall, ceiling or other structural member. Cable ties may be looped around the cable and may be secured to the panel so as to support the cables thereagainst. As may be appreciated, the cable supported in this manner is supported directly against the panel surface so that the cable runs in contact with the panel therealong.

In certain situations, it may be desirable to space the cable away from the panel. The art has seen the use of cable spacers which are devices which may be interposed between the cables and a mounting structure to which the cables are supported. Typically, these spacers are used in combination with a support wire run between two fixed locations. Such use is commonplace in the communications industry where electrical signal cables, such as telephone cables, may be suspended from a support wire spanning two utility poles.

U.S. Pat. No. 4,562,982 shows one example of spacers used to support and space a cable or bundle of cables from an overhead support wire. Multiple spacers of the type shown therein may be used in stacked relationship to vary the distance between the overhead support wire and the cables which are supported therefrom. A cable tie is interposed through the spacer(s) around the cable and the support wire. The cable tie suspends the cable from the support wire.

Attempts to use spacers of this type against flat planar panels such as walls and the like are limited in that the spacer must be positioned so that its lower surface is located against the panel and its upper surface, which supports the cable, is opposed thereto. Use in this manner is required as the cable tie must be interposed through the panel, the spacer and around the supported cable so as to secure both the cable and the spacer to the panel. Such limited use of the spacer of the type shown in the '982 patent greatly reduces mounting flexibility in that the cable support surface and the wall mounted surface must be on opposite sides of the spacer.

It is desirable to provide a spacer which may be used with a wall or other flat surface to secure a cable at multiple positions with respect thereto.

SUMMARY OF THE INVENTION

It is an object of the present invention to provide an improved spacer which supports a cable, wire or conduit adjacent a mounting panel such as a wall, ceiling or the like.

It is a further object of the present invention to provide a spacer which may be positioned in multiple positions with respect to the panel so as to accommodate a cable, wire or conduit at multiple positions with respect thereto.

It is a still further object of the present invention to provide a spacer which accommodates a cable tie to secure the spacer to the panel in multiple positions with respect thereto.

In the efficient attainment of these and other objects, the present invention provides a spacer for spacing an article such as a cable, wire or conduit from a mounting panel. The mounting panel supports a cable tie for securing the spacer to the mounting panel. The spacer includes a spacer body having an article support surface for securely supporting the article thereagainst. The spacer body has plural non-coplanar mounting surfaces where each mounting surface is capable of being supported against the mounting panel. The spacer body further includes a cable tie attachment element which permits the accommodation of the cable tie where the spacer element is supported with any of the non-coplanar mounting surfaces being positioned against the mounting panel.

As more particularly shown by way of the preferred embodiment herein, the spacer includes an upper surface and an opposed lower surface. The upper surface forms the article support surface, while the lower surface forms one of the plural non-coplanar mounting surfaces. The spacer also includes opposed side surfaces forming the other non-coplanar mounting surfaces so that the spacer may be mounted against the mounting panel in multiple positions. This allows the cable support surface to be disposed at different positions with respect to the mounting panel thereby increasing the mounting flexibility of the spacer.

DETAILED DESCRIPTION OF THE PREFERRED EMBODIMENTS

Figure 1:
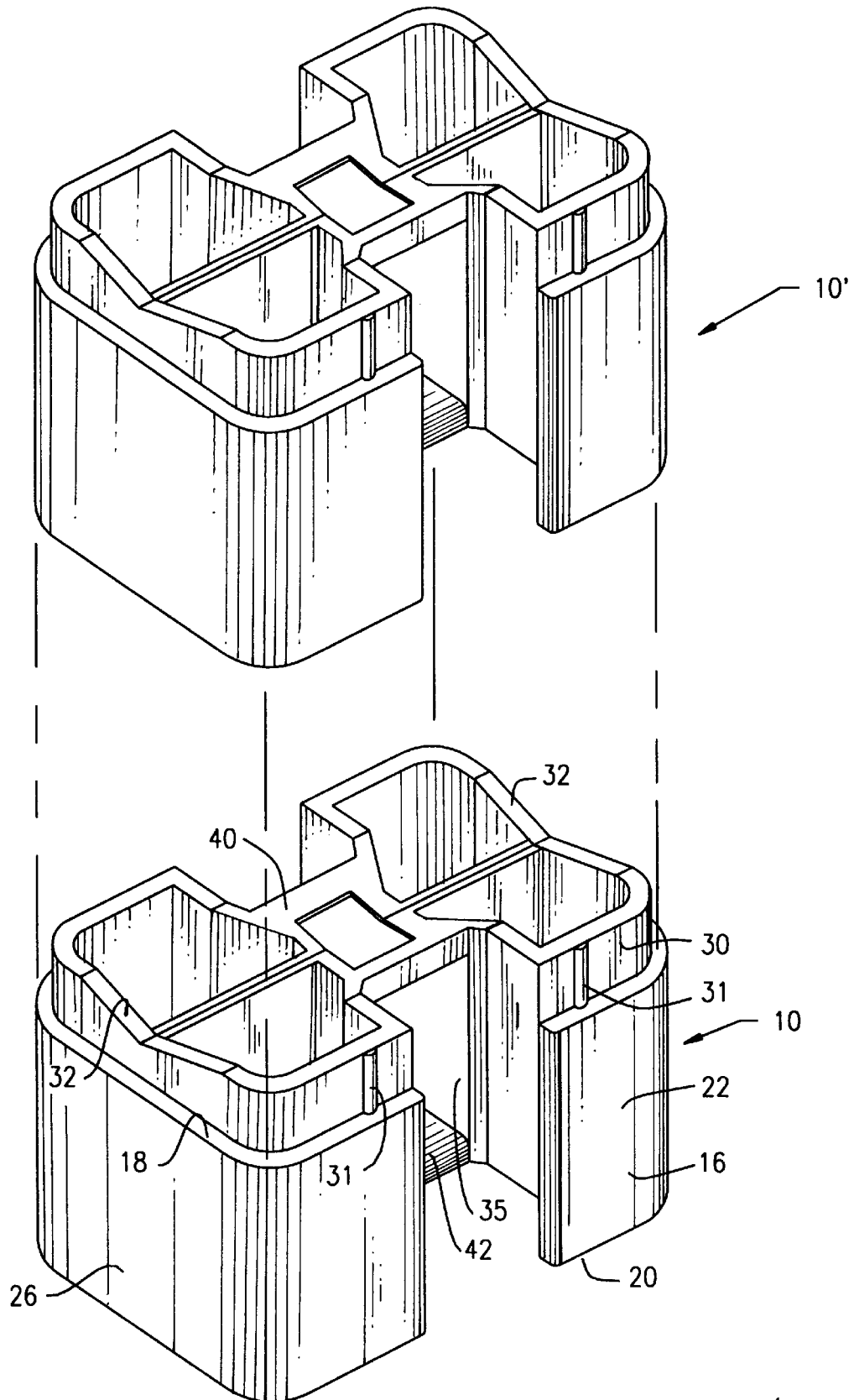
FIG. 1 is an exploded perspective view of a pair of cable spacers of the present invention shown in stacked relationship.
Figure 2:
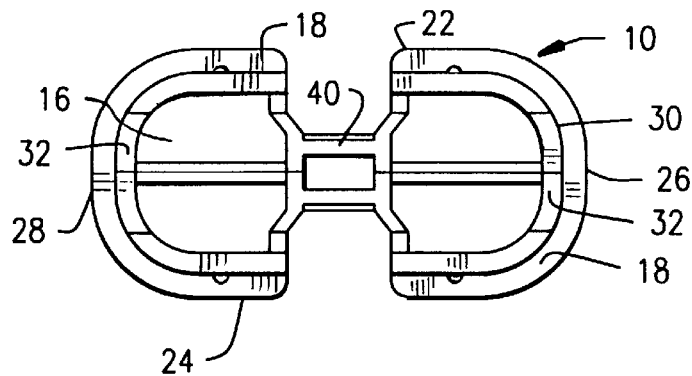
FIGS. 2, 3 and 4 are top, side and end views, respectively, of one of the cable spacers of FIG. 1.
Figure 3:
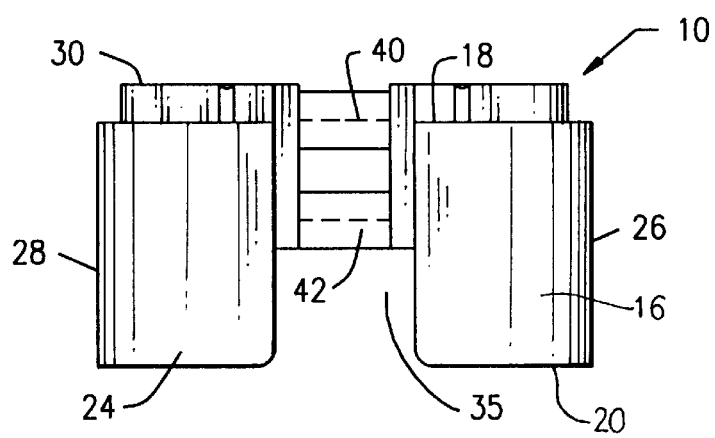
Figure 4:
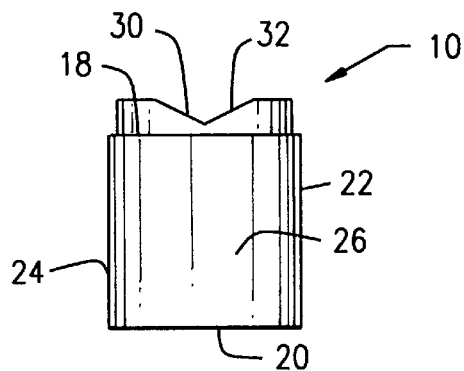
Figure 5:
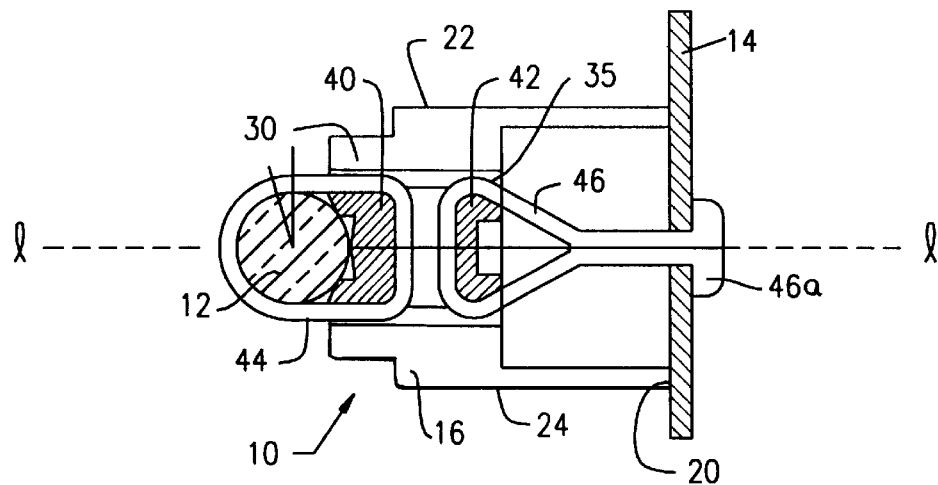
FIGS. 5, 6 and 7 show one of the cable spacers of FIG. 1 supported against a mounting panel with the cable support surface thereof being located at different positions.
Figure 6:
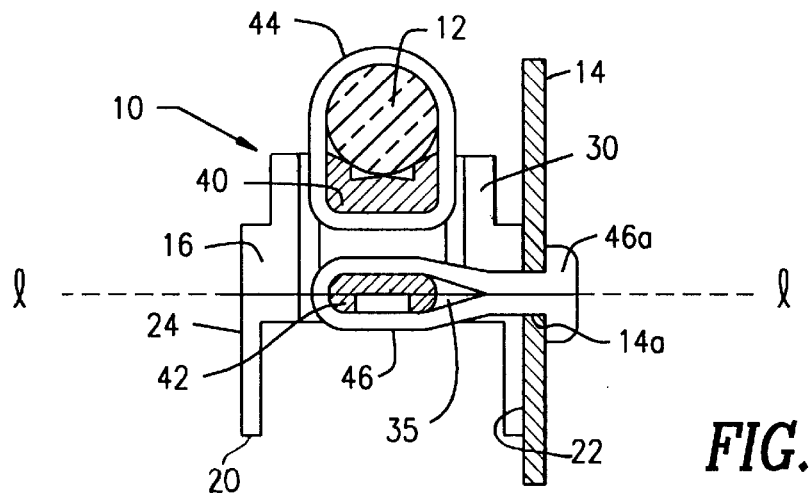
Figure 7:
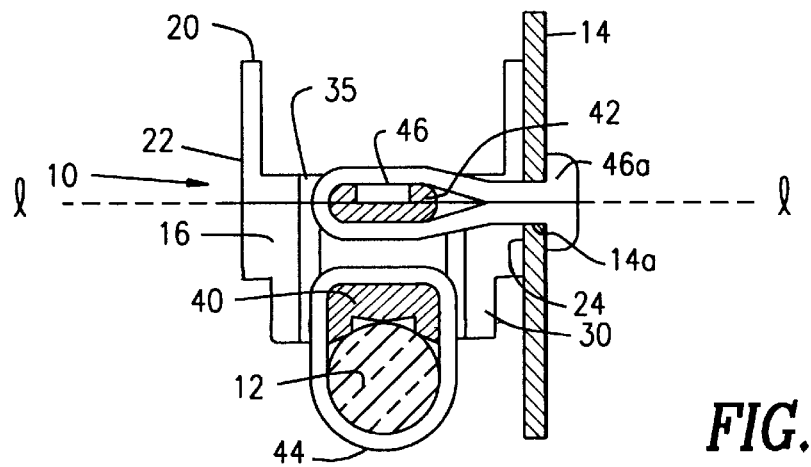

A stackable multi-positionable cable spacer of the present invention is shown in FIGS. 1–7. Spacer 10, shown in stacked relationship with identical spacer 10', may be used to support a conduit 12 to a planar mounting panel 14 (FIGS. 5–7). In the present illustrative embodiments, the tern conduit is used to refer to various elongate members such as electrical wires and cables, fluid conduits or pipes. However, more commonly spacer 10 is used to support electrical cables and is referred to as a cable spacer. Further, mounting panel 14 may include structures such as walls, ceilings or other planar members against which conduits are to be supported.

Referring more specifically to FIGS. 1–4, spacer 10 includes a generally parallelepiped shaped hollow body 16 including opposed open upper and lower surfaces 18 and 20. Extending between open upper and lower surfaces 18 and 20 are opposed side walls 22 and 24 and opposed end walls 26 and 28. Upper surface 18 of body 16 includes an upwardly extending perimetrical male annular lip 30 which is designed for interlocking engagement with the lower surface 20 of identically formed cable spacer 10' so as to permit stackable interlocking engagement between two cable spacers. Extending annular lip 30 may include spaced apart projections 31 thereon to provide interference fit between the upwardly extending lip 30 and the lower surface 20 of an adjacent cable spacer 10'. The ability to stack cable spacers of this type is well known in the art.

Upwardly extending annular lip 30 includes a pair of v-shaped notches 32 adjacent each of end walls 26 and 28.

V-shaped notches 32 form a conduit cradle for the accommodation and positional confinement of conduit 12 which is to be mounted to cable spacer 10 (FIGS. 5–7). Spacer body 16 includes a central passage 35 extending through and between opposed side walls 22 and 24. As spacer body 16 is generally hollow, passage 35 is in communication with the open lower surface 20 of spacer 10.

Referring additionally to FIGS. 5–7, spacer body 16 includes a cable tie attachment element in the form of a first cable tie accommodating member 40 spanning central passage 35 adjacent annular lip 30. First cable tie accommodating member 40 generally bridges annular lip 30 across central passage 35. Spaced from first cable tie accommodating member 40 and also spanning central passage 35 is a further cable tie attachment element in the form of a second cable tie accommodating member 42. Second cable tie accommodating member 42 is accessible from either side wall 24 or 26 of body 16 or from open lower surface 20. The positioning and arrangement of second cable tie accommodating member 42 permits spacer body 16 to be mounted in multiple positions with respect to mounting panel 14.

Referring now to FIGS. 5–7, conduit 12 may be secured adjacent upper surface 18 of body 16 by positioning the conduit 12 within the v-shaped notches 32 of annular lip 30. The cradle formed by the annular lip and the v-shaped notches supports and retains the conduit 12 in a central location with respect to spacer body 16. A conventional cable tie 44 may be looped around conduit 12 so positioned, and first cable tie accommodating member 40. The tie 44 may be cinched in a conventional fashion to secure conduit 12 adjacent the upper surface 18 of body 16. While use of a cable tie 44 is shown as the preferred method of securing conduit 12 to spacer body 16, any other banding structures such as a hose clamp may also be employed.

With conduit 12 securely supported on spacer 10, the spacer including the conduit, may be secured against mounting panel 14 in one of multiple positions so as to vary the position of the conduit 12 with respect to the mounting panel 14. In each position shown in FIGS. 5–7, a second cable tie 46 is used to support the spacer 10 against the mounting panel 14. Cable tie 46 is inserted through an opening 14a in mounting panel 14 and is looped about the second cable tie accommodating member 42 of spacer body 16 and back through opening 14a where it is secured in the head 46a of cable tie 46. A commercially available cable tie known as a "button-tie" is particularly suitable for such use.

As central passage 35 extends through each opposed side wall 22 and 24 as well as being in communication with open lower surface 20, the second cable tie accommodating member 42 may be accessed in one of three positions. FIG. 5 shows spacer body 16 mounted against mounting panel 14 with open lower surface 20 placed thereagainst. Cable tie 46 is extended through the open lower surface 20 and around second cable tie accommodating member 42 and back through open lower surface 20, where it is passed back through the opening 14a and is secured in the head 46a of cable tie 46. In this position, conduit 12 supported in the cradle formed by annular lip 32 is positioned generally along a line "1" extending perpendicular to mounting panel 14 and passing through opening 14a.

Referring now to FIG. 6, spacer body 16 is positioned so that one side wall 22 is placed against mounting panel 14. As central passage 35 extends through side wall 22, cable tie 46 may be looped around second cable tie accommodating member 42 and back through side surface 26 to be secured in head 46a of cable tie 46. In this fashion, conduit 12 supported in the cradle formed by annular lip 32 is located at a position rotated 90° upwardly with respect to the position shown in FIG. 5.

In diametrically opposite fashion, FIG. 7 shows spacer body 16 secured to mounting panel 14 with side wall 24 thereagainst. Passage 35 extending through side wall 24 allows the cable tie 46 to be looped around second cable tie accommodating member 42 and back therethrough where it is secured in head 46a. In this position, conduit 12 is located at a position rotated downwardly 90° with respect to the position shown in FIG. 5.

While the present invention has been described in a manner where the conduit 12 is secured to spacer body 16 and then the spacer body 16 is secured to mounting panel 14. This explanation is provided for clarity. In typical implementation, one or more spacers 10 are supported in line along a mounting panel 14 in a desired position and then the conduit 12 may be secured to the spacers using cable ties 44. Further, in the example shown in FIGS. 5–7, a single cable spacer 10 is employed. It, however, may be appreciated that two or more cable spacers 10, 10' stacked in a manner shown in FIG. 1, may be employed to further vary the position of the conduit.

Various changes to the foregoing described and shown structures would now be evident to those skilled in the art. Accordingly, the particularly disclosed scope of the invention is set forth in the following claims.

What is claimed is:

1. A spacer for spacing an article such as a cable wire, conduit or the like from a mounting panel such as a wall, ceiling or the like, said mounting panel supporting a cable tie for securing said spacer to said mounting panel, said spacer comprising:

a spacer body including:
an article support surface for securely supporting said article thereagainst;
plural non-coplanar mounting surfaces, said mounting surfaces capable of being supported against said mounting panel;
a cable tie attachment element for accommodating said cable tie with any one of said plural non coplanar mounting surfaces being positioned against said mounting panel, said cable tie attachment element being accessible through said one mounting surface supported against the panel.

2. A spacer according to claim 1 wherein said article support surface is distinct from any of said plural non-coplanar mounting surfaces.

3. A spacer according to claim 2 wherein said spacer body includes a first interlocking portion co-extensive with said article support surface and a second interlocking portion opposed to said article support surface, said second interlocking portion adapted to interlockingly engage said first interlocking portion of a further said spacer body so as to permit stackable interlocking assembly of two said spacers.

4. A spacer according to claim 3 wherein said spacer body is generally parallelepiped shaped having said article support surface parallel to and spaced from one of said plural mounting surfaces and a pair of parallel spaced apart side surfaces forming the other said plural mounting surfaces.

5. A spacer according to claim 4 wherein said spacer body includes a central passage extending therethrough from one according to said side surfaces to the other of said side surfaces and wherein said cable tie attachment element spans said central passage.

6. A spacer according to claim 5 wherein said spacer body further includes an accommodation member adjacent said article support surface for accommodating a bailing strap for securing said article to said article support surface.

7. A spacer according to claim 6 wherein said accommodation member is spaced from said cable tie attachment element.

8. A device for supporting an elongate article such as a cable, wire, conduit or the like at a location spaced from a planar panel comprising:

an article support spacer including a spacer body;

said spacer body having an article support surface, a cable tie accommodating member adjacent said article support surface for accommodating a strap looped therethrough and around said article for securing said article to said article support surface;

said spacer body having plural panel mounting surfaces, each panel mounting surface being differently located with respect to said article support surface so as to dispose said article support surface at different location with respect to said planar panel upon engagement of said differently located panel mounting surfaces with said panel;

a cable tie attachment element for accommodating a cable tie extending from said panel with any one of said differently located panel mounting surfaces being in engagement with said panel so as to secure said space body to said panel, said cable tie attachment element being accessible through said one mounting surface engaged with said panel.

9. A device according to claim 8 wherein said panel mounting surfaces are non-coplanar.

10. A device of claim 9 wherein said spacer body includes an upper portion including said article support surface, an opposed lower portion including one of said plural panel mounting surfaces and at least two spaced apart side portions extending between said upper and lower portions, each of said side portions defining another of said plural panel mounting surfaces.

11. A device according to claim 10 wherein said upper portion of said spacer body is interlockingly engagable with said lower portion of another said spacer body to provide for interlocking stacking of two of said spacers.

12. A kit of parts used to secure an article such as a wire, cable, conduit or the like to a generally flat panel comprising:

a spacer member having opposed, spaced apart upper and lower portions, said upper portion adapted for supporting said article and said lower portion adapted for positioning against said flat panel and opposed spaced apart side portion extending between said upper and lower portions, said side portions adapted for positioning adjacent said flat panel, said spacer member further including a cable tie accommodating member adjacent said upper portion and a cable tie attachment element spaced from said cable tie accommodating member, said cable tie attachment element accessible through said side portions and said lower portion;

a first elongate cable tie adapted to be wrapped around said upper portion of said spacer member; and a second elongate cable tie adapted to be inserted through an opening in said flat panel and about said cable tie attachment element to secure said spacer with one of said lower portions or either of said side portions adjacent said flat panel.

13. A multi-positionable spacer for mounting a conduit against a wall comprising:

a spacer body having an article support surface and plural additional sides arranged for alternative mounting of one of said plural additional sides against said wall;

said spacer body further including a cable tie attachment element for accommodating a cable tie extending from said wall for securing said spacer body against said wall;

said cable tie attachment element accommodating said cable tie with any of said plural additional sides being mounted against said wall, said cable tie attachment element accessible through said one additional side mounted against said wall.

14. A spacer according to claim 13 wherein said spacer body is an elongate parallelepiped member and wherein said plural additional sides include a first side opposed to said article support surface and opposed second and third sides extending between said first side and said article support surface.

15. A spacer according to claim 14 wherein said spacer body includes a centrally located first passage extending through said opposed second and third sides and wherein said cable tie attachment element includes a bridge member spanning said first passage.

16. A spacer according to claim 15 wherein said first side includes a second passage extending therethrough, said second passage being in communication with said first passage.

17. A spacer according to claim 16 further including a cable tie accommodating member for accommodating a cable tie for securing said conduit to said article support surface.

18. A spacer according to claim 17 wherein said cable tie accommodating member is positioned adjacent said article support surface.

19. A spacer according to claim 18 wherein said cable tie accommodating member is separate and spaced from said cable tie attachment element.

* * * * *